Figure 1:
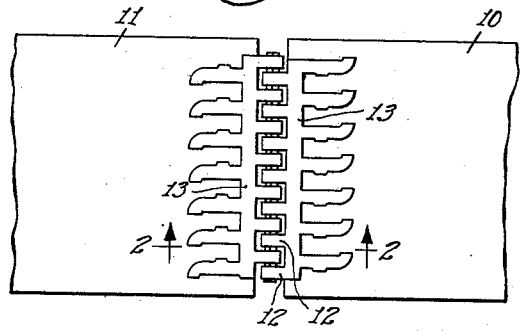

Nov. 8, 1932.    J. C. OLSEN    1,887,361

FASTENING FOR BELTS AND THE LIKE

Filed Nov. 11, 1931

Witness:
V. Siljander

Inventor
John C. Olsen
By Joseph Harris
His Atty.

Patented Nov. 8, 1932

1,887,361

UNITED STATES PATENT OFFICE

JOHN C. OLSEN, OF CHICAGO, ILLINOIS, ASSIGNOR TO FLEXIBLE STEEL LACING COMPANY, OF CHICAGO, ILLINOIS, A CORPORATION OF ILLINOIS

FASTENING FOR BELTS AND THE LIKE

Application filed November 11, 1931. Serial No. 574,240.

This invention relates to improvements in fastenings for belts and the like.

In flexible or hinged types of fastenings for power-transmitting belts, laundry aprons and the like, one of the serious difficulties encountered, is that of excessive wear on the parts due to the constant pivotal action produced while passing around the pulleys or wheels. With ordinary round hinge pins, whether of metal or raw hide, the wear is rapid on the contacting surfaces of both the hinge or loop elements and the pin and in order to overcome this difficulty, sectional rocker hinge pins have heretofore been devised, such as shown for instance in patents to Purple 1,212,258 and 1,594,691, wherein the rocker hinge pin sections are provided with a non-rotative bearing engagement with the respective sets of loop or hinge members in which directly seated. Such rocker hinge pins are superior to the ordinary cylindrical hinge pin in that the wear due to pivotal action is eliminated between the pin sections and their respective sets of loops in which seated and the pivotal or rocking action is confined to the two convex rocking surfaces of the pin sections.

Experience has demonstrated, however, that on account of the fact that the pivotal action in such types of rocker hinge pins is not a true pivotal movement about a fixed line or axis, another disadvantage arises due to a "whipping" action, which takes place each time the belt ends are deflected from the straight line of travel to a circular line of travel in passing onto the pulleys. When the advance or leading belt end first begins to curve or bend around the pulley, the lacing or fastener proper, which is secured to said leading belt end, tends to assume a tangent to the pulley, which tangent is out of line with the following or rear belt end that has not yet reached the pulley or begun to be deflected from the straight line movement of the belt. As the leading belt end tends to assume such new tangential position, the rocker hinge pin section carried in the apexes or bends of the lacing loops attached to said leading belt end, is shifted transverse to the line of the other belt end and its lacing attached thereto with the result that the outer edge of said hinge pin section is thereby suddenly impinged against the inner sides of the arms of the lacing loops attached to the rear or following belt end. This constant whipping or impinging of the pin sections against the loops, due to the rapidly moving belt, causes crystallization and excessive wear of the lacings and breakdown, thus necessitating frequent replacement.

One object of this invention is to provide a strong, durable fastening of the sectional hinge pin type for belt ends and like power-transmitting members, wherein wear between the pin sections and the embracing loops of the fastener proper is reduced to a minimum.

Another object of this invention is to provide fastening means of the type indicated, wherein undesired transverse movement of the hinge pin sections relative to the embracing loops of the fasteners proper is prevented and a true pivotal action about a fixed line or center is obtained.

Still another object of this invention is to provide an improved sectional rocker hinge pin such that the sections rock or rotate on each other about a predetermined fixed axis and relative transverse shift between the pin sections is prevented or restricted to a predetermined amount.

An additional object of the invention is to provide an improved sectional rocker hinge pin of the type indicated, which may be used in belt lacings of types now commonly employed without any material increase in cost of manufacture or mode of application of the fasteners.

Other objects of the invention will more clearly appear from the description and claims hereinafter following.

Figure 2:
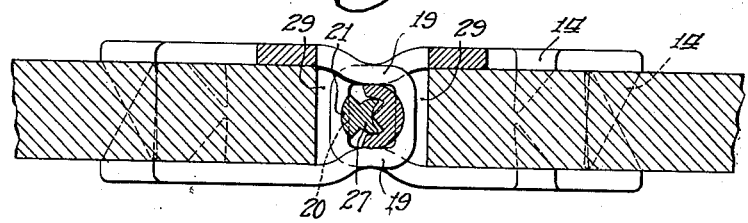
Figure 3:
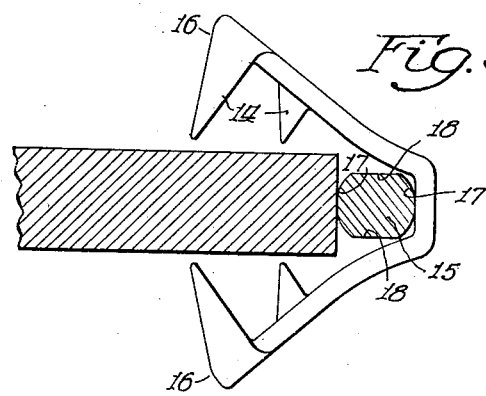
Figure 4:
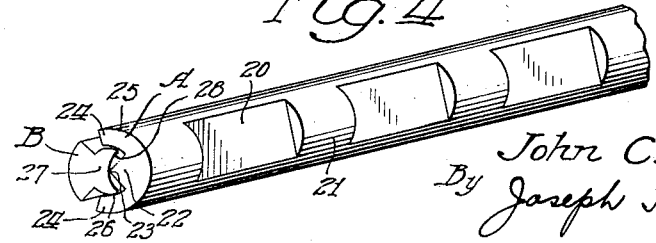

In the drawing forming a part of this application, Figure 1 is a top plan view of portions of adjacent ends of a belt showing the improvements applied thereto. Figure 2 is an enlarged, vertical, longitudinal sectional view, corresponding to the line 2—2 of Figure 1. Figure 3 is a vertical, sectional view of an end of a belt showing the manner of gauging and applying one of the belt fasteners in a manner suitable for utilization with the improved rocker hinge pin. And Figure 4 is a perspective view of the improved pin.

In said drawing, 10 and 11 indicate adjacent ends of a flexible power-transmitting member, such as a belt, and which are adapted to be detachably, flexibly or hingedly connected. To each belt end is secured a suitable fastener proper, the type shown comprising a plurality of loops 12—12 uniformly, laterally spaced apart so that the loops 12 of one fastener loosely interfit between the oppositely extended loops of the other fastener. In the particular construction shown, all of the loops are preferably united by integral transversely extending strips 13—13 and each fastener or plate is secured to the belt end by prongs 14—14 imbedded and entered into the belt from opposite sides thereof, as clearly indicated in Figure 2.

In applying the fasteners proper, it is essential that the loops be accurately formed and positioned with reference to the belt end in order to cooperate properly with the rocker hinge pin and permit its insertion and removal. To this end, as shown in Figure 3, the fastener is applied to the belt end by using a suitable gauge pin 15, which serves also as a mandrel to form the loops. As will be understood, the fastener or lacing is initially manufactured with the prongs thereof diverging, as shown at 16—16 and is then hammered home so as to imbed and clinch the prongs. The gauge pin has rounded inner and outer edges 17—17 and flat top and bottom surfaces 18—18 so that, when the fastener or lacing is applied, not only will the loops 12 thereof be properly spaced with respect to the end of the belt, but will be formed with top and bottom parallel arms 19—19, spaced apart a distance corresponding to the vertical dimension of the gauge pin 15 so that each loop may be said to have a true channel formation and the interfitting loops, when aligned, will define a substantially rectangular opening crosswise of the belt, as clearly indicated in Figure 2.

The improved rocker hinge pin comprises two parts or sections A and B. The section A is formed on the outer or rear side thereof with alternated flat bearing seats 20 and rounded lugs or knobs 21, spaced in accordance with the lateral spacing of the loops 12, for the purpose hereinafter described. On its inner side, the pin section A is formed with a longitudinal rib of generally triangular cross section, as indicated at 22, the same providing a fulcrum edge 23. Above and below the rib 22, the pin section A is formed with arcuate inwardly extending arms 24—24, each extended beyond a vertical, diametrical plane passing through the knife or fulcrum edge 23. Said upper and lower extending arms 24 are also formed with outer and inner bearing surfaces 25 and 26 respectively, which are made concentric with the fulcrum or knife edge 23 as an axis.

The complemental hinge pin member or section B is formed on its outer side with similar flat bearing seats 20 and alternated lugs or knobs 21 and on its inner side is constituted by a partial cylindrical section 27 of reduced diameter so that it will more or less snugly fit and rotate within the extension arms 24 of the other pin section A. The cylindrical section 27 in turn is provided with a concave bearing surface 28 directly cooperable with the fulcrum or knife edge 23 so as to freely rock thereon, as will be understood. The outer over-all diameter, vertically, of the pin section A is such that it corresponds to the spacing between the parallel sections 19—19 of the respective loops and hence may rotate within the loops freely without binding, but at the same time so as to prevent any relative shift between the loops in a direction normal or perpendicular to the belt. In actual practice, the mouth or spacing between the free ends of the extension arms 24 of the member A and the maximum diameter of the cylindrical section 27 of the member B will be made such that the member B may be entered laterally within the member A so that there will be a slight clearance between the outer surfaces of the cylindrical section 27 and the inner surfaces 26 of the member A, but of such restricted amount as to prevent any appreciable relative shift between the pin sections in a direction perpendicular to the belt.

In applying the fastener to the ends of a belt, two fasteners proper of suitable length corresponding to the width of the belt are applied to the respective belt ends in the manner indicated in Figure 3. A hinge pin of the desired length is then obtained and after the two sets of loops of the fasteners have been properly interfitted and aligned and with the belt ends moved closely together to take up the spaces 29—29 provided for by the gauge pin, then the hinge pin is inserted laterally through the loops. Each hinge pin section will then be seated in its respective loops so as to have the flat bearing seats 20 thereof in engagement with one of the series of vertical portions of the loops attached to one belt end and the projections or lugs 21 spaced therebetween. The belt ends are then drawn apart as far as possible, resulting in the condition shown in Figure 2, so that longitudinal shift of either pin section with respect to the fasteners proper is prevented due to the lugs 21, as will be obvious.

As clear from inspection of Figure 2, the pin section A is the only one which has bearing contact with the alined horizontal sections 19—19 of the two sets of loops and hence relative vertical shift between the iterfitting loops, as viewed in Figure 2, is prevented. Further, it is apparent that the pivotal action between the two belt ends and the loops respectively attached thereto, is confined to a true pivotal movement about the axis or line defined by the fulcrum edge 23 of the pin section A, and hence whipping is eliminated while at the same time providing for the desired flexibility.

The pin sections may obviously be made at relatively small expense by rolling; the same may be replaced or renewed as desired as readily as prior types of rocker pins; and accidental displacement is prevented as hereinbefore pointed out.

The invention has been illustrated and described with particular reference to fastenings for ordinary power transmitting belts but, as will be understood by those skilled in the art, the improved arrangement is applicable to other band-like types of flexible, power-transmitting members, wherein one or more flexible joints are desired and all changes and modifications are contemplated that come within the scope of the claims appended hereto.

What is claimed is:

1. In combination with a flexible power-transmitting member having interfitting, oppositely extending aligned loops, a removable hinge pin extending through said loops, said pin comprising two sections having a line fulcrum bearing therebetween, each pin section having non-rotative bearing engagement with one of the sets of loops; and means preventing relative shift between the pin sections in a direction normal to the line of tension between the loops.

2. In a fastening for belt ends, the combination with two complemental interfitting sets of loops, each set adapted to be attached to the end of a belt; of a removable hinge pin extending through said loops, said pin comprising two sections having a rocking bearing therebetween; cooperative formations on the loops and pin sections preventing relative rotation between each pin section and its respective set of loops; and means confining the rocking movement of the pin sections to a substantially constant axis within the loops.

3. In a fastening for belt ends, the combination with two complemental interfitting sets of loops, each set adapted to be secured to a belt end and the loops being provided with flat bearing seats at the apexes thereof; of a removable hinge pin extending through said loops, said pin comprising two sections having line fulcrum bearing therebetween and each pin section having flat bearing seats on its outer side cooperable with the corresponding said seats of the loops; and means limiting relative shift between the pin sections in a direction normal to said line fulcrum bearing.

4. As an article of manufacture, a rocker hinge pin comprising two elements, one of said elements having a longitudinally extending fulcrum ridge on its inner side, and the other element having a longitudinally extending bearing surface engageable therewith; and means limiting relative shift between the pin elements in a direction transverse to the line of fulcrum engagement while allowing relative rocking movement between the pin elements.

5. As an article of manufacture, a rocker hinge pin comprising two elements, one of said elements having a longitudinally extending fulcrum ridge on its inner side, and the other element having a longitudinally extending bearing surface engageable therewith; and means limiting relative shift between the pin elements in a direction transverse to the line of fulcrum engagement while allowing relative rocking movement between the pin elements, said means including integral portions on one element embracing the other element.

6. As an article of manufacture, a rocker hinge pin comprising two elements, one element being provided with a longitudinally extending fulcrum ridge on its inner side and the other element with a longitudinally extending opposed bearing surface cooperable therewith, each of said elements being provided on its outer side with alternated flat bearing seats and projecting lugs; and means limiting relative shift between the pin elements in a direction normal to the line of fulcrum engagement therebetween while allowing relative rocking movement between the pin elements.

7. As an article of manufacture, a rocker hinge pin comprising two elements, one of said elements having a longitudinally extending fulcrum ridge centrally located on its inner side and arcuate extensions spaced from and on opposite sides of said ridge, and the other element having a longitudinally extending cylinder-like section rockable within and confined by said extensions and provided along the inner side thereof with a bearing face cooperable with said ridge, whereby the two elements are adapted to rock on each other while restrained from relative bodily shifting transversely to the line of fulcrum engagement.

8. In a fastening for belt ends, the combination with two sets of interfitting loops adapted to be secured, respectively, to the ends of a belt, the loops being formed with flat apexes and spaced parallel sections adjacent thereto so that, when the loops are aligned, the same define a substantially rectangular opening viewed endwise of the loops; of a rocker hinge pin removably seated within said loops, said pin comprising two sections having a rocking bearing therebetween, one of said sections relatively snugly embracing the other and the embracing section being of such dimension, in a direction perpendicular to said parallel sections of the loops, as to relatively snugly fit therein and thereby prevent relative shift between the sets of loops in a direction perpendicular to the belt.

9. In a fastening for belt ends, the combination with two sets of interfitting loops adapted to be secured, respectively, to the ends of a belt, the loops being formed with flat apexes and spaced parallel sections adjacent thereto so that, when the loops are aligned, the same define a substantially rectangular opening viewed endwise of the loops; of a rocker hinge pin removably seated within said loops, said pin comprising two sections having a rocking bearing therebetween, one of said sections relatively snugly embracing the other and the embracing section being of such dimension, in a direction perpendicular to said parallel sections of the loops, as to relatively snugly fit therein and thereby prevent relative shift between the sets of loops in a direction perpendicular to the belt, each of said pin sections, on its outer side, being provided with alternated flat bearing seats and projecting lugs spaced to conform to the spacing of the loops.

10. In a fastening for belt ends, the combination with two sets of interfitting loops adapted to be secured, respectively, to the ends of a belt, the loops being formed with flat apexes and spaced parallel sections adjacent thereto so that, when the loops are alined, the same define a substantially rectangular opening, viewed endwise of the loops; of a rocker hinge pin removably seated within said loops, said pin comprising two elements, one of which has a longitudinally extending, fulcrum ridge centrally located on its inner side and the other an opposed longitudinally extending concave bearing face cooperating with said ridge to provide a rocking bearing therebetween, each of said elements being provided on its outer side with flat bearing seats engaging the flat apexes of the respective sets of loops and one of said elements being of such over-all dimension, in a direction perpendicular to said parallel sections of the loop, as to relatively snugly fit therebetween.

In witness that I claim the foregoing I have hereunto subscribed my name this 3rd day of November 1931.

JOHN C. OLSEN.